United States Patent
Donovan et al.

(10) Patent No.: US 7,620,210 B1
(45) Date of Patent: Nov. 17, 2009

(54) ANISOTROPIC OPTIMIZATION FOR TEXTURE FILTERING

(75) Inventors: Walter E. Donovan, Saratoga, CA (US); Anders M. Kugler, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 12/015,426

(22) Filed: Jan. 16, 2008

Related U.S. Application Data

(63) Continuation of application No. 10/672,577, filed on Sep. 26, 2003, now Pat. No. 7,339,593.

(60) Provisional application No. 60/491,392, filed on Jul. 31, 2003.

(51) Int. Cl.
*G06K 9/00* (2006.01)
*G09G 5/00* (2006.01)

(52) U.S. Cl. .................. 382/108; 382/260; 345/582

(58) Field of Classification Search ................. 382/100, 382/106, 108, 176, 181, 203, 168, 260, 274, 382/276, 303, 305; 345/582, 586; 359/326
See application file for complete search history.

(56) References Cited

U.S. PATENT DOCUMENTS

| | | | |
|---|---|---|---|
| 6,040,837 A * | 3/2000 | Wong et al. ................. 345/586 |
| 6,104,415 A | 8/2000 | Gossett | |
| 6,252,698 B1 * | 6/2001 | Oikawa ...................... 359/326 |
| 6,707,458 B1 * | 3/2004 | Leather et al. .............. 345/582 |
| 6,724,395 B1 | 4/2004 | Treichler | |
| 6,850,243 B1 * | 2/2005 | Kilgariff et al. ............. 345/582 |
| 6,919,904 B1 * | 7/2005 | Kilgariff ..................... 345/582 |
| 7,071,937 B1 | 7/2006 | Collodi | |
| 7,221,371 B2 | 5/2007 | Donovan et al. | |
| 7,271,810 B1 | 9/2007 | Newhall et al. | |

OTHER PUBLICATIONS

Zwicker, et al. "EWA Splatting," IEEE Transactions on Visualization and Computer Graphics, IEEE Service Center, Jul. 2002. vol. 8(3): pp. 1-15.

Chen, et al. :Footprint Area Sampled Texturing, IEEE Transactions on Visualization and Computer Graphics, Mar./Apr. 2004 vol. 10(2): pp. 230-240.

* cited by examiner

*Primary Examiner*—Seyed Azarian
(74) *Attorney, Agent, or Firm*—Patterson & Sheridan, LLP

(57) ABSTRACT

Anisotropic optimization is a technique to reduce the number of texture samples anisotropically filtered to determine a texture value associated with a graphics fragment. Reducing the number of texture samples anisotropically filtered reduces the number of texture samples read from memory and speeds up the filter computation. A programmable bias is used to control the number of texture samples used during anisotropic filtering, permitting a user to determine a balance between improved texture map performance and anisotropic texture filtering quality.

19 Claims, 8 Drawing Sheets

ANISOTROPIC OPTIMIZATION FOR TEXTURE FILTERING

CROSS-REFERENCE TO RELATED APPLICATIONS

This application is a continuation of U.S. patent application Ser. No. 10/672,577, filed Sep. 26, 2003 now U.S. Pat. No. 7,339,593 which claims the priority benefit of, commonly owned provisional U.S. Patent Application No. 60/491,392, entitled "Anisotropic Optimization for Texture Filtering," filed Jul. 31, 2003, having common inventors as this application. The subject matter of the aforementioned applications is incorporated by reference as though fully set forth herein.

FIELD OF THE INVENTION

One or more aspects of the invention generally relate to computer graphics, and more particularly to filtering texture map data.

BACKGROUND

Conventional graphics processors are exemplified by systems and methods developed to read and filter texture map samples. To simplify the texture map filtering performed within a graphics processor, a texture is prefiltered and various resolutions of the prefiltered texture are stored as mip mapped texture maps. FIG. 1A is a conceptual diagram of prior art showing a mip mapped texture including a highest resolution texture map, Texture Map 101. A Texture Map 102, a Texture Map 103, and a Texture Map 104 are successively lower resolution texture maps, mip maps, each storing prefiltered texture samples.

Classic mip maps are isotropically filtered, i.e. filtered symmetrically in the horizontal and vertical directions using a square filter pattern. Bilinearly filtered and trilinearly filtered mip maps result in high quality images for surfaces with major and minor texture axis that are similar in length. When a trilinearly filtered texture is applied to a receding surface viewed "on edge", aliasing artifacts (blurring) become apparent to a viewer as the texture is effectively "stretched" in one dimension, the receding direction, as the texture is applied to the surface. FIG. 1B illustrates a prior art application of Texture Samples 110 to a Pixel 120 of a receding surface (in texture space). A Minor Axis 125 is significantly shorter than a Major Axis 130 and isotropic filtering of the texture samples will result in aliasing artifacts.

In contrast to isotropic filtering, anisotropic filtering uses a rectangular shaped filter pattern, resulting in fewer aliasing artifacts for surfaces with major and minor texture axis that are not similar in length. FIG. 1C illustrates a prior art application of anisotropic filtering to Pixel 120. Texture Samples 150 are aligned along Major Axis 130. Each sample within Texture Samples 150 may be read from a different mip map. Texture Samples 150 are anisotropically filtered to produce a filtered texture sample. Classic anisotropic filtering filters 16 texture samples in a non-square pattern, compared with 8 texture samples filtered when trilinear filtering is used or 4 texture samples filtered when bilinear filtering is used. Therefore, anisotropic filtering reads and processes twice as many texture samples as trilinear filtering.

In general, producing a higher-quality image, such as an image produced using anisotropic filtering, requires reading more texture samples and performing more complex operations to produce each filtered texture sample. Therefore texture sample filtering performance decreases as image quality improves, due to limited bandwidth available for reading texture samples stored in memory and limited computational resources within a graphics processor.

Accordingly, there is a need to balance performance of anisotropic texture sample filtering with image quality to minimize image quality degradation for a desired level of anisotropic texture sample filtering performance.

SUMMARY

The current invention involves new systems and methods for performing anisotropic optimization during texture mapping. Some anisotropic filtering is performed using fewer texture samples, thereby reducing the number of texture samples read and speeds up texture sample filtering computations. A programmable bias is used to control the number of texture samples used during anisotropic filtering, permitting a user to determine a balance between improved texture map performance and texture filtering quality.

Various embodiments of a method of the invention include computing a biased ratio value for anisotropic texture map filtering. A ratio value for a texture map is received. A bias is applied to the ratio value to produce the biased ratio value. A number of texture samples to filter is determined based on the biased ratio.

Various embodiments of a method of the invention include determining a number of texture samples for use in an anisotropic texture map filtering computation. A ratio value is received. A biased ratio value is computed using the ratio value and a bias. The number of texture samples for use in the anisotropic texture map filtering computation is determined based on the biased ratio value.

Various embodiments of the invention include a computing system. The computing system includes a host processor, a host memory, a system interface, and a graphics processor. The host memory stores programs for the host processor. The system interface is configured to interface with the host processor and the graphics processor. The graphics processor includes a texture unit configured to receive texture parameters and compute a filtered texture sample. The texture unit includes an anisotropic optimization unit configured to compute a biased ratio value using one or more of the texture parameters.

BRIEF DESCRIPTION OF THE VARIOUS VIEWS OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

DISCLOSURE OF THE INVENTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

In conventional graphics processors a ratio value representing the ratio of the minor axis to the major axis, e.g. minor axis/major axis, is computed using a technique known to those skilled in the art. The ratio value is used to determine a number of texture samples to read and process during anisotropic filtering. When optimized anisotropic filtering is performed a programmable bias is applied to the ratio value, resulting in a biased ratio value that is used to control the number of texture samples read and processed during anisotropic filtering.

For example, a biased ratio value for anisotropic optimization is computed using a ratio value (ratio_value) and a bias (bias). In some embodiments, biased ratio values are computed using this equation:

$$\text{biased ratio} = \min((\text{ratio\_value} * (1+\text{bias})), 1). \quad 1).$$

In one embodiment bias is represented as a 4 bit value divided by $2^4$. In the embodiment the bias may represent 0, 1/16, 1/8, 3/16, 1/4, 5/16, 3/8, 7/16, 1/2, 9/16, 5/8, 11/16, 3/4, 13/16, 7/8, or 15/16. In other embodiments fewer or additional bits are used to represent one or more biases and each bias is divided by $2^i$, where i is the number of bits used to represent the bias.

Figure 1A:
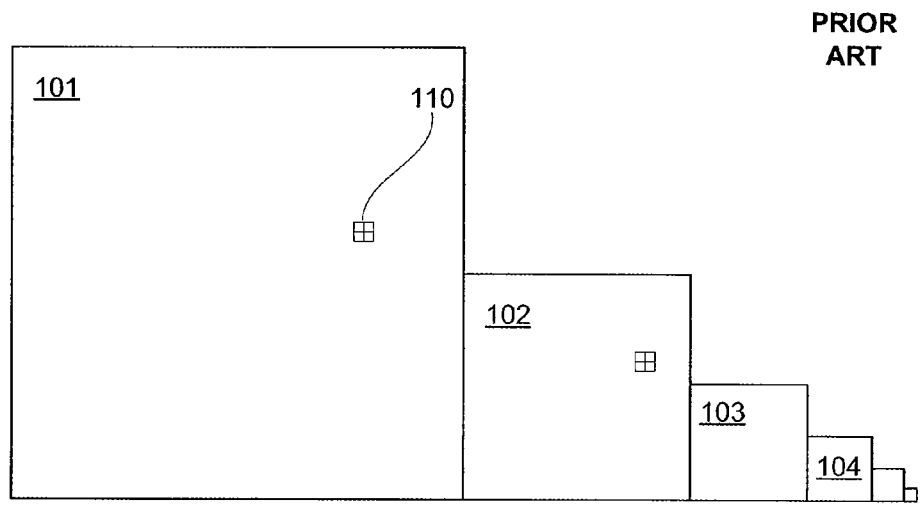
FIG. 1A is a conceptual diagram of prior art showing a mip mapped texture.
Figure 1B:
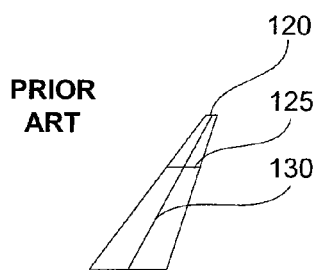
FIGS. 1B and 1C illustrate a prior art application of texture samples to a surface.
Figure 1C:
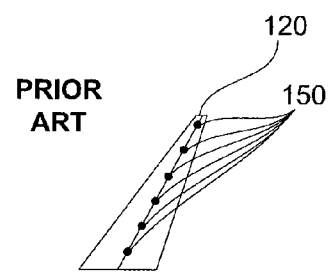
Figure 2A:
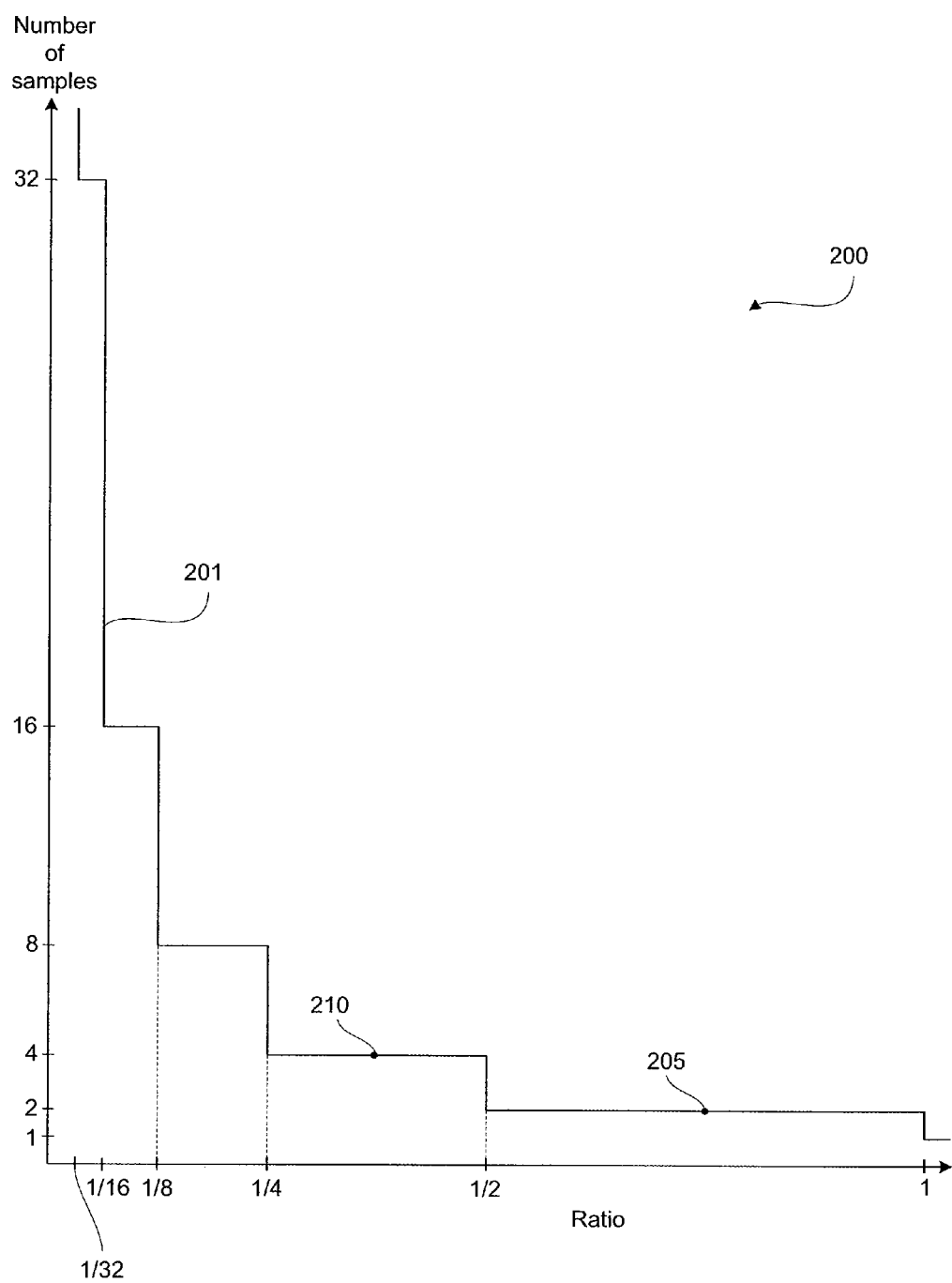
FIGS. 2A and 2B illustrate anisotropic ratios in accordance with one or more aspects of the present invention.
Figure 2B:
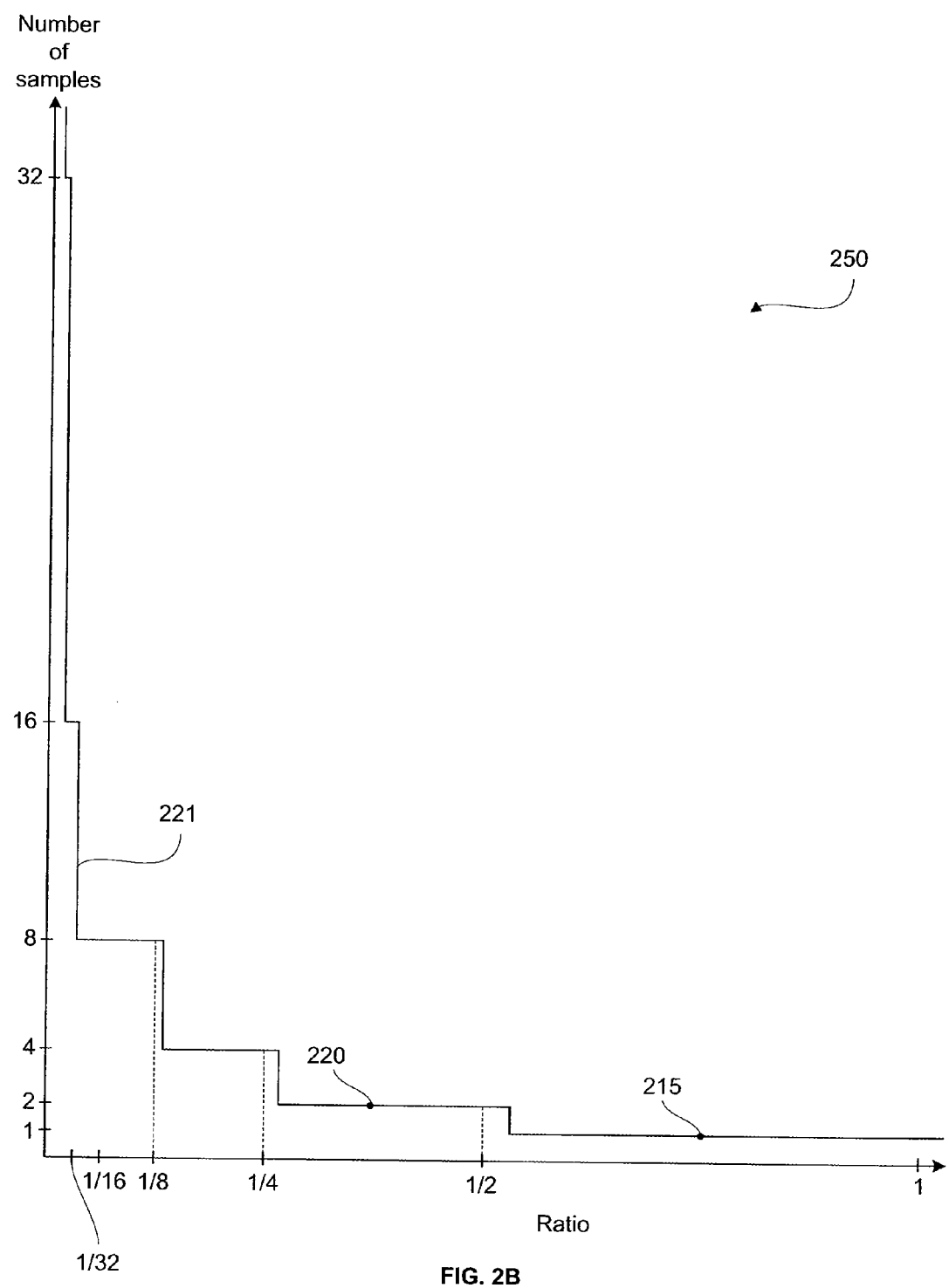

FIGS. 2A and 2B illustrate the relationship between various biased ratio values and the number of texture samples used during anisotropic filtering in accordance with one or more aspects of the present invention. The horizontal axis of a Graph 200 represents an input ratio value ranging in value from 1/n to 1, where n is greater than or equal to 1. The vertical axis of Graph 200 represents the number of texture samples ranging in value from 1 to n. When conventional anisotropic texture filtering is performed, a piecewise-linear function represented by a Line 201, corresponding to a bias of 0, is used to determine the number of samples based on a ratio value. For example, Point 205 corresponds to an input ratio value of 3/4 and a number of samples of 2. Point 210 corresponds to an input ratio value of 3/8 and a number of samples of 4. As the ratio value decreases the number of texture samples increases, i.e. as the footprint of the pixel in texture space "stretches" the number of texture samples used to produce a filtered texture sample increases.

In FIG. 2B the horizontal axis of a Graph 250 represents an input ratio ranging in value from 1/n to 1, where n is greater than or equal to 1. The vertical axis of Graph 250 represents the number of texture samples ranging in value from 1 to n. A piecewise-linear function represented by a Line 221, corresponding to a bias of 15/16, is used to determine the number of samples based on a ratio value. For example, Point 215 corresponds to an input biased ratio value of 3/4 and a number of samples of 1. Point 220 corresponds to an input biased ratio value of 3/8 and a number of samples of 2. Line 221 is shifted and compressed to the left compared with Line 201 of FIG. 2A; therefore fewer texture samples are used during anisotropic filtering when a bias of 15/16 is applied to the ratio value, assuming a uniform distribution of ratio values within an image.

A user may program the bias balancing improved performance (clock cycles or memory bandwidth) against image quality. In an alternate embodiment a driver may program the bias based on a user performance mode selection, e.g., fastest, compromise, high quality, and the like. Furthermore, the bias may be predetermined or programmed for each texture, i.e. associated with a texture ID (identifier). Anisotropic optimization may be used to compute biased ratio values for cubemaps (used for cubic environment mapping), one-dimensional textures, two-dimensional textures, or three-dimensional textures, or other mip mapped textures.

Figure 3:
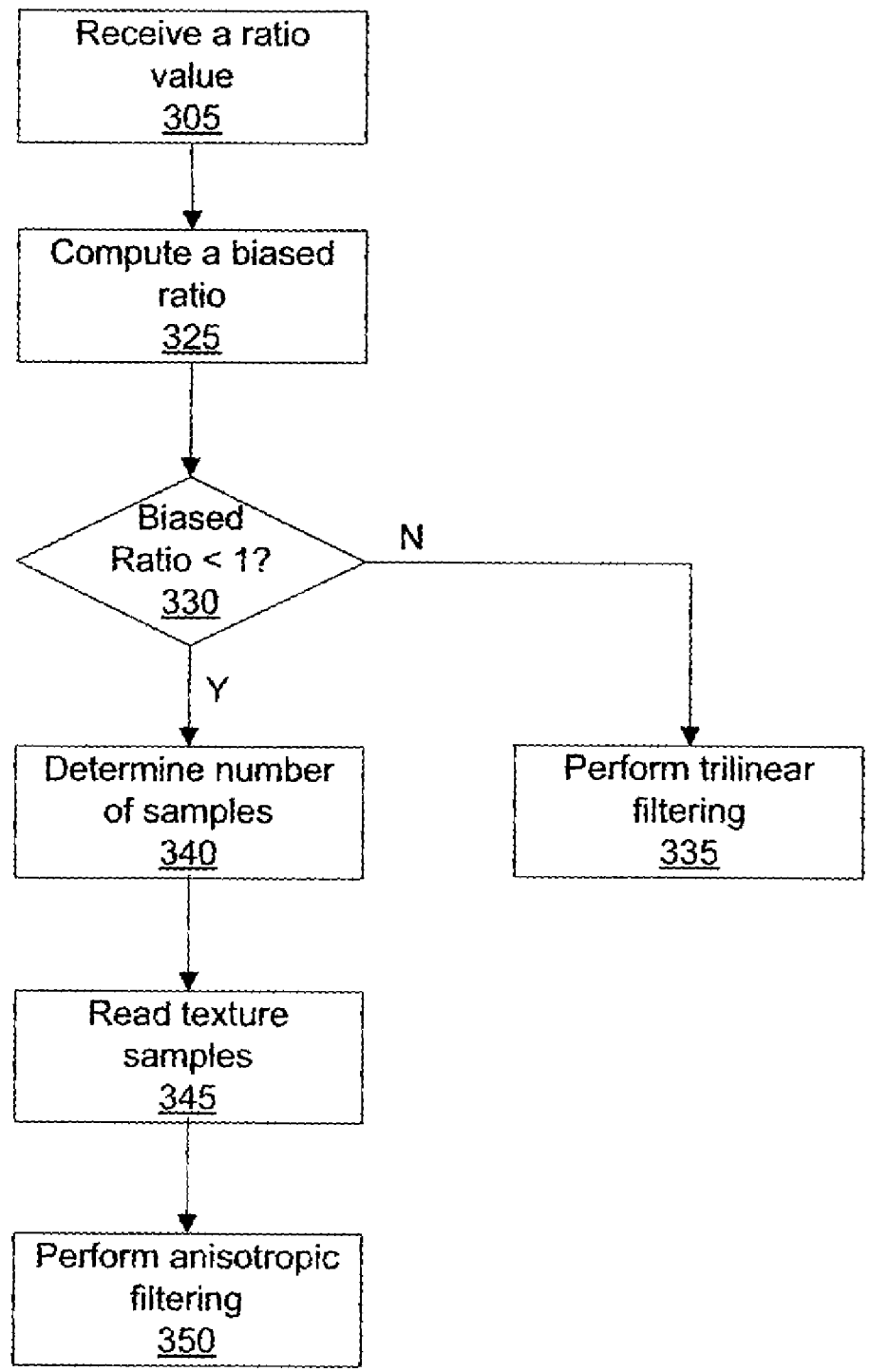
FIG. 3 illustrates an embodiment of a method of determining a number of texture samples for use in an anisotropic texture map filtering computation in accordance with one or more aspects of the present invention.

FIG. 3 illustrates an embodiment of a method of determining a number of texture samples for use in an anisotropic texture map filtering computation in accordance with one or more aspects of the present invention. In step 305 a ratio value is received. In step 325 a biased ratio value is computed using the ratio value and a bias. In an alternate embodiment, a lookup table (LUT) is loaded by a driver with biased ratio values and the biased ratio value is read from the LUT using the ratio value received in step 305 as an index. In step 330 the biased ratio value is evaluated and if it is determined to be greater than or equal to 1, in step 335 as many as 8 texture samples (assuming a two-dimensional texture) are read from memory and trilinear interpolation is performed. If, in step 330 it is determined that the biased ratio value is less than 1, in step 340 a number of texture samples based on the biased ratio value is determined via table lookup. For example, a LUT is loaded by a driver with values specifying numbers of texture samples to be read from memory in step 345. The number of texture samples is read from the LUT using the ratio value received in step 305 as an index. In step 345 the number of texture samples are read from memory. In step 350 the texture samples read from memory in step 345 are anisotropically filtered to produce a filtered texture sample.

Figure 4:
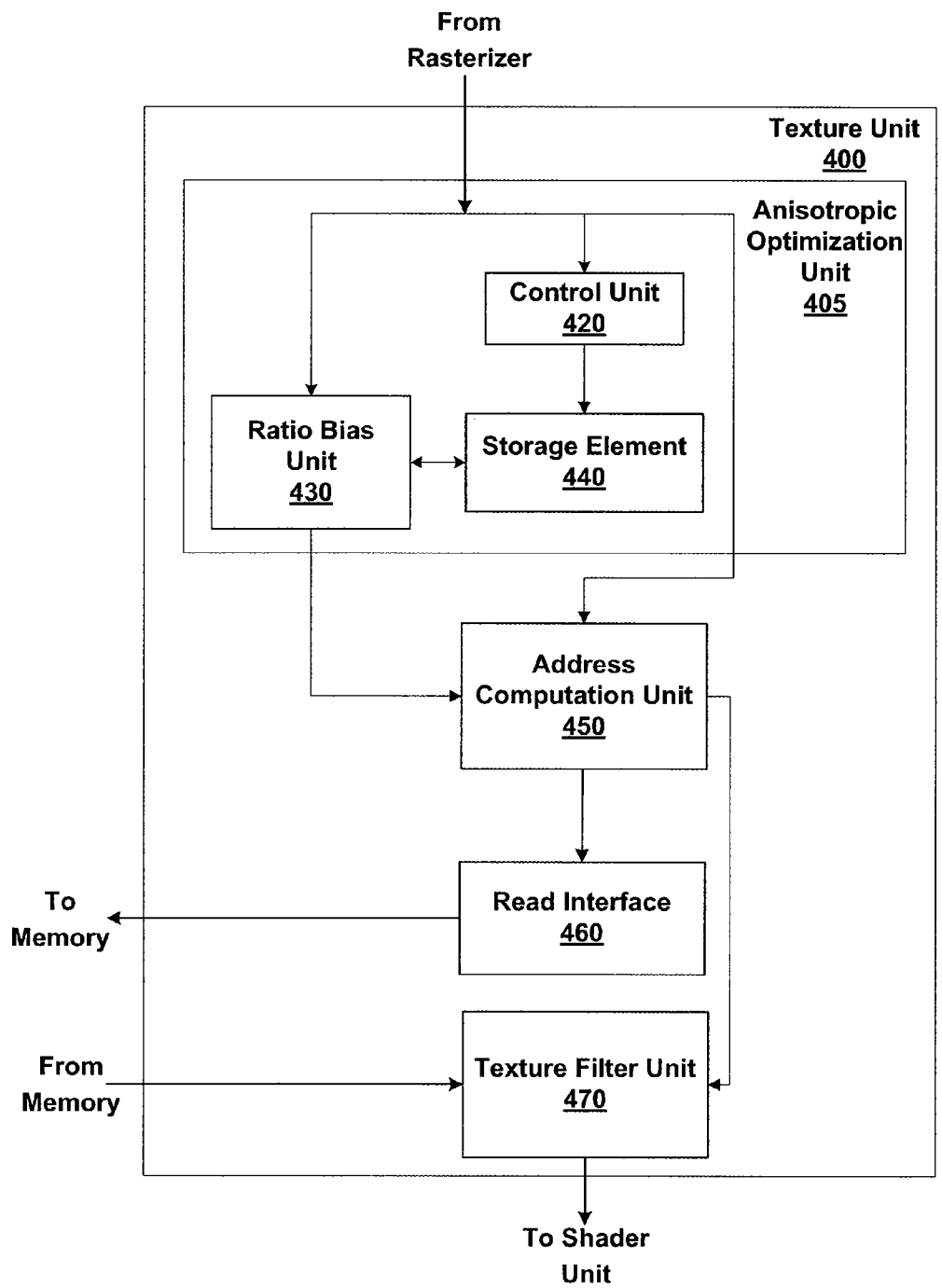
FIG. 4 is a block diagram of a portion of a shader unit including a texture unit in accordance with one or more aspects of the present invention.

FIG. 4 is a block diagram of a portion of a graphics processing pipeline, to be described further herein, including a Texture Unit 400 in accordance with one or more aspects of the present invention. In some embodiments Texture Unit 400 receives data from a rasterizer, e.g., program instructions, and parameters associated with fragments (texture IDs, texture coordinates such as s and t, and the like). A fragment is formed by the intersection of a pixel and a primitive. Primitives include geometry, such as points, lines, triangles, quadrilaterals, meshes, surfaces, and the like. A fragment may cover a pixel or a portion of a pixel. Likewise, a pixel may include one or more fragments. In an embodiment Texture Unit 400 receives ratio values from the rasterizer. In another embodiment Texture Unit 400 computes ratio values using parameters received from the rasterizer.

Texture Unit 400 includes an Anisotropic Optimization Unit 405. A Control Unit 420 within Anisotropic Optimization Unit 405 processes the program instructions, such as instructions to load one or more biases into a Storage Element 440. Storage Element 440 includes one or more registers, or the like. Biases may each correspond to a specific texture ID and in some embodiments Storage Element 440 stores biases corresponding to texture IDs.

Ratio values and texture IDs are received by Ratio Bias Unit 430 within Anisotropic Optimization Unit 405. Ratio Bias Unit 430 computes each biased ratio value for anisotropic optimization using a ratio value and a bias. Ratio Bias Unit 430 passes a ratio value through unchanged when the bias is set to 1, resulting in conventional anisotropic filtering for backwards compatibility.

In an alternate embodiment Storage Element 440 is a look up table containing biases read using texture IDs. The biases in the look up table may be loaded by a software driver or application using program instructions. In another alternate embodiment Storage Element 440 stores one or more biases, each bias summed with 1 thereby simplifying the computation performed by Ratio Bias Unit 430 to compute a biased ratio value.

Ratio Bias Unit 430 outputs biased ratio values to an Address Computation Unit 450. Address Computation Unit 450 uses texture parameters (s, t, level of detail, and the like) received by Texture Unit 400 and biased ratio values to determine a number of texture samples and addresses for reading the number of texture samples stored in memory. Address Computation Unit 550 outputs the addresses to a Read Interface 460. Read Interface 460 outputs the addresses and a read request to a memory, e.g., cache, RAM, ROM, or the like. Texture samples read from memory are received from the memory by a Texture Filter Unit 470. Texture Filter Unit 470 receives texture parameters (fractional s, t, and level of detail values) from Address Computation Unit 450 and filters the texture samples read from memory using bilinear interpolation, trilinear interpolation, or anisotropic filtering to produce filtered texture samples. The filtered texture samples are output to a shader unit, described further herein, to compute a color for each fragment.

Figure 5:
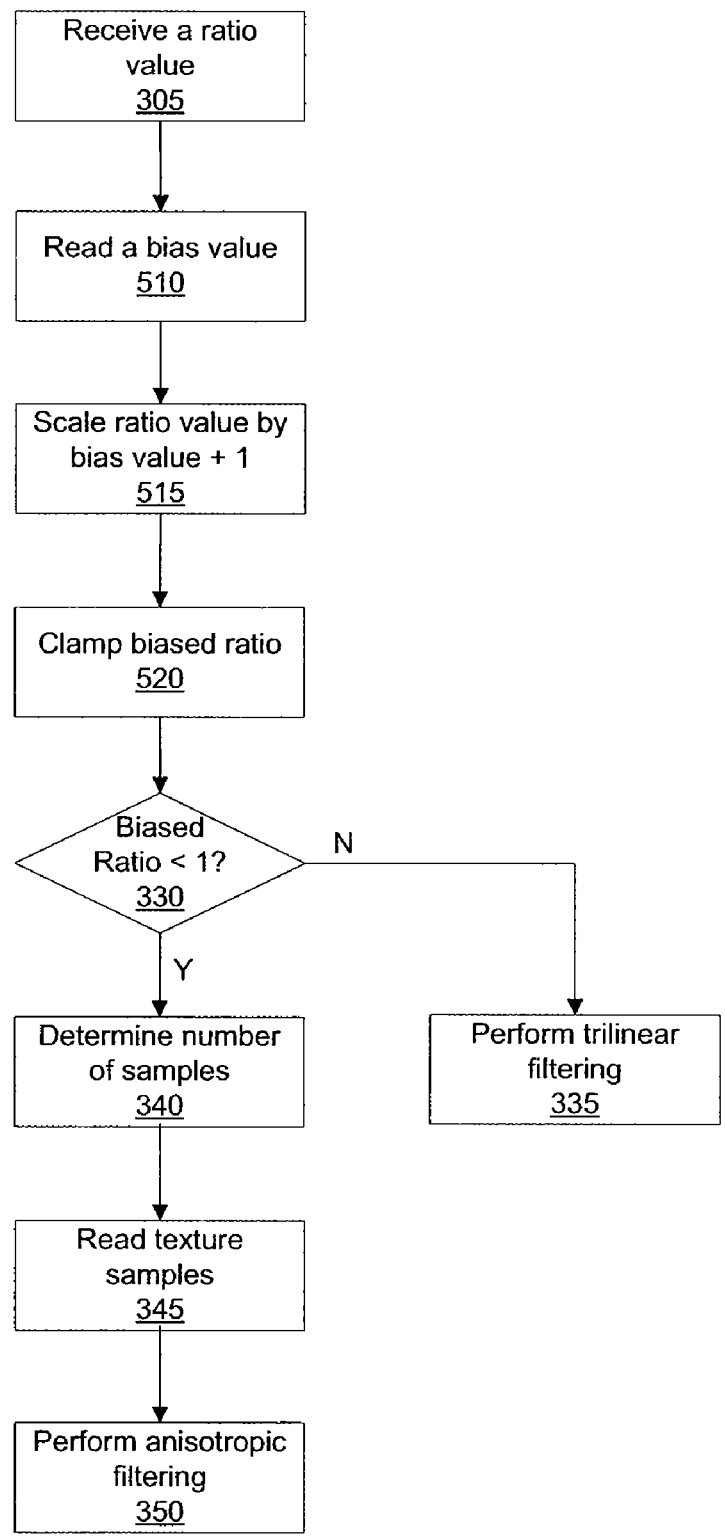
FIG. 5 illustrates an embodiment of a method computing a biased ratio value for anisotropic texture map filtering in accordance with one or more aspects of the present invention.

FIG. 5 illustrates an embodiment of a method computing a biased ratio value for anisotropic texture map filtering in accordance with one or more aspects of the present invention including steps 305, 330, 335, 340, 345, and 350 described in relation to FIG. 3. Step 305 proceeds as previously described. In step 510 Ratio Bias Unit 430 reads a bias from Storage Element 440. In step 515 Ratio Bias Unit 430 sums the bias read in step 510 with one and scales the ratio value by the sum to produce the biased ratio value. In an alternate embodiment Ratio Bias Unit 430 reads a bias summed with one from Storage Element 440. In another alternate embodiment Ratio Bias Unit 430 reads a bias from Storage Element 440 using a texture ID. In yet another alternate embodiment Ratio Bias Unit 430 reads the biased ratio value from Storage Element 440 using the ratio value or using a combination of the ratio value and a texture ID. Continuing in step 520, Ratio Bias Unit 430 clamps the biased ratio value to a value of 1 if the biased ratio value is greater than 1. In step 520 Ratio Bias Unit 430 outputs the biased ratio value to Address Computation Unit 450.

In step 330 Address Computation Unit 450 determines if the biased ratio value is greater than or equal to 1, and, if so, in step 335 as many as 8 texture samples are read from memory and trilinear interpolation is performed. If, in step 330 Address Computation Unit 450 determines the biased ratio value is less than 1, in step 340 Address Computation Unit 450 computes a number of texture samples based on the biased ratio value. Address Computation Unit 450 determines and outputs addresses to Read Interface 460. In step 345 Read Interface 460 initiates a read request to read the number of texture samples from memory. In step 350 the texture samples are received from memory by Texture Filter Unit 470 and anisotropically filtered producing a filtered texture sample.

Figure 6:
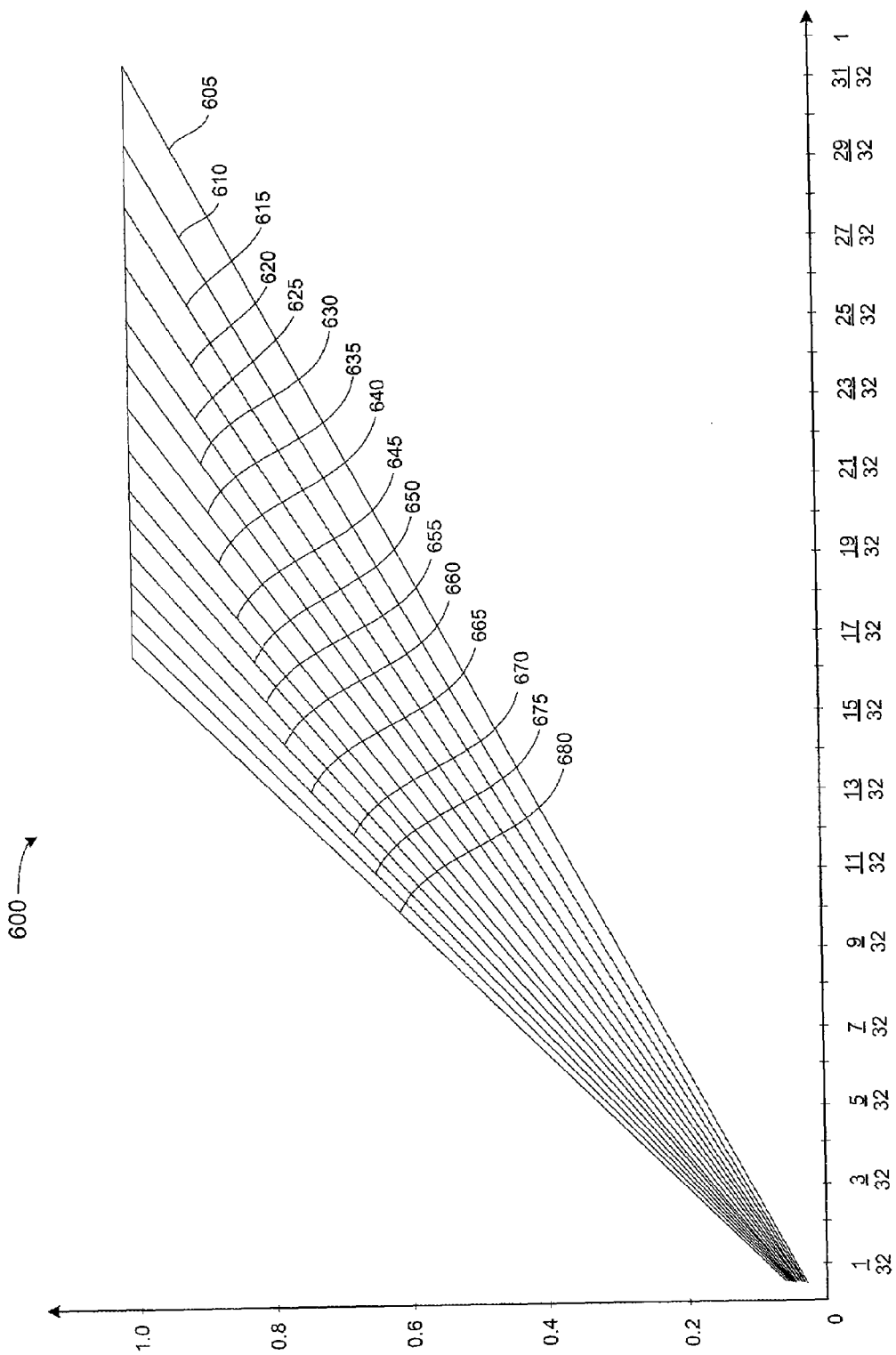
FIG. 6 illustrates the relationship between ratio values and biased ratio values using a variety of biases in accordance with one or more aspects of the present invention.

FIG. 6 illustrates the relationship between ratio values and biased ratio values using a variety of biases in accordance with one or more aspects of the present invention. The horizontal axis of a Graph 600 represents an input ratio value ranging in value from 1/n to 1, where n is greater than or equal to 1. The vertical axis of Graph 200 represents biased ratio values, also ranging in value from 1/n to 1. When conventional anisotropic texture filtering is performed, a linear function (described in relation to FIG. 4) represented by a Line 605, corresponding to a bias of 0, is used to determine the number of samples based on a ratio value. Lines 610, 615, 620, 625, 630, 635, 640, 645, 650, 655, 660, 665, 670, 675, and 680 correspond to progressively larger biases, each bias increasing by $1/16$. As the bias increases more of the biased ratio values are equal to 1, resulting in trilinear interpolations replacing anisotropic interpolations.

Figure 7:
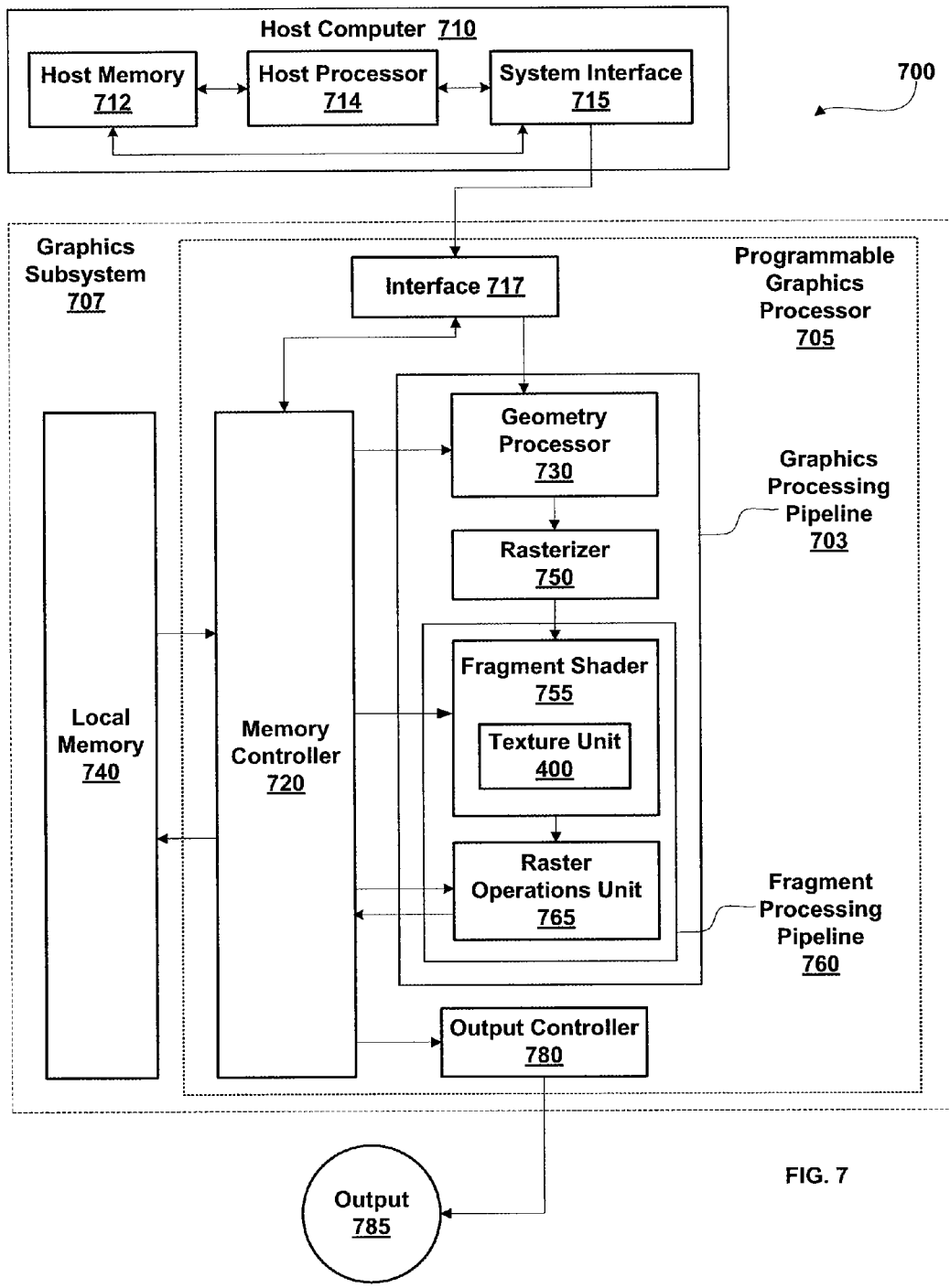
FIG. 7 is a block diagram of an exemplary embodiment of a respective computer system in accordance with one or more aspects of the present invention including a host computer and a graphics subsystem.

FIG. 7 is a block diagram of an exemplary embodiment of a Computing System generally designated 700 and including a Host Computer 710 and a Graphics Subsystem 707 including an embodiment of Texture Unit 400. Computing System 700 may be a desktop computer, server, laptop computer, palm-sized computer, tablet computer, game console, cellular telephone, computer based simulator, or the like. Host computer 710 includes Host Processor 714 that may include a system memory controller to interface directly to Host Memory 712 or may communicate with Host Memory 712 through a System Interface 715. System Interface 715 may be an I/O (input/output) interface or a bridge device including the system memory controller to interface directly to Host Memory 712. Examples of System Interface 715 known in the art include Intel® Northbridge and Intel® Southbridge.

Host computer 710 communicates with Graphics Subsystem 707 via System Interface 715 and an Interface 717. Graphics Subsystem 707 includes a Local Memory 740 and a Programmable Graphics Processor 705. Programmable Graphics Processor 705 uses memory to store graphics data, including texture maps, and program instructions, where graphics data is any data that is input to or output from computation units within Programmable Graphics Processor 705. Graphics memory is any memory used to store graphics data or program instructions to be executed by Programmable Graphics Processor 705. Graphics memory can include portions of Host Memory 712, Local Memory 740 directly coupled to Programmable Graphics Processor 705, storage resources coupled to the computation units within Programmable Graphics Processor 705, and the like. Storage resources can include register files, caches, FIFOs (first in first out), and the like.

In addition to Interface 717, Programmable Graphics Processor 705 includes a Graphics Processing Pipeline 703, a Memory Controller 720 and an Output Controller 780. Data and program instructions received at Interface 717 can be passed to a Geometry Processor 730 within Graphics Processing Pipeline 703 or written to Local Memory 740 through Memory Controller 720. In addition to communicating with Local Memory 740, and Interface 717, Memory Controller 720 also communicates with Graphics Processing Pipeline 703 and Output Controller 780 through read and write interfaces in Graphics Processing Pipeline 703 and a read interface in Output Controller 780.

Within Graphics Processing Pipeline 705, Geometry Processor 730 and a programmable graphics fragment processing pipeline, Fragment Processing Pipeline 760, perform a variety of computational functions. Some of these functions are table lookup, scalar and vector addition, multiplication, division, coordinate-system mapping, calculation of vector normals, tessellation, calculation of derivatives, interpolation, and the like. Geometry Processor 730 and Fragment Processing Pipeline 760 are optionally configured such that data processing operations are performed in multiple passes through Graphics Processing Pipeline 703 or in multiple passes through Fragment Processing Pipeline 760. Each pass through Programmable Graphics Processor 705, Graphics Processing Pipeline 703 or Fragment Processing Pipeline 760 concludes with optional processing by a Raster Operations Unit 765.

Vertex programs are sequences of vertex program instructions compiled by Host Processor 714 for execution within Geometry Processor 730 and Rasterizer 750. Shader programs are sequences of shader program instructions compiled by Host Processor 714 for execution within Fragment Processing Pipeline 760. Geometry Processor 730 receives a stream of program instructions (vertex program instructions and shader program instructions) and data from Interface 717 or Memory Controller 720, and performs vector floating-point operations or other processing operations using the data. The program instructions configure subunits within Geometry Processor 730, Rasterizer 750 and Fragment Processing Pipeline 760. The program instructions and data are stored in graphics memory, e.g., portions of Host Memory 712, Local Memory 740, or storage resources within Programmable Graphics Processor 705. When a portion of Host Memory 712 is used to store program instructions and data the portion of Host Memory 712 can be uncached so as to increase performance of access by Programmable Graphics Processor 705. Alternatively, configuration information is written to registers within Geometry Processor 730, Rasterizer 750 and Fragment Processing Pipeline 760 using program instructions, encoded with the data, or the like.

Data processed by Geometry Processor 730 and program instructions are passed from Geometry Processor 730 to a Rasterizer 750. Rasterizer 750 is a sampling unit that processes primitives and generates sub-primitive data, such as fragment data, including parameters associated with fragments (texture IDs, texture coordinates, and the like). Rasterizer 750 converts the primitives into sub-primitive data by performing scan conversion on the data processed by Geometry Processor 730. Rasterizer 750 outputs fragment data and shader program instructions to Fragment Processing Pipeline 760.

The shader programs configure the Fragment Processing Pipeline 760 to process fragment data by specifying computations and computation precision. Fragment Shader 755 is optionally configured by shader program instructions such that fragment data processing operations are performed in multiple passes within Fragment Shader 755. Fragment Shader 755 includes an embodiment of previously described Texture Unit 400. In one embodiment Texture Unit 400 is configured to read shader program instructions stored in Local Memory 740 or Host Memory 712 via Memory Controller 720.

In some embodiments of Computing System 700 graphics processing performance is limited by memory bandwidth, e.g. between Host Memory 712 and Programmable Graphics Processor 720, between Local Memory 740 and Graphics Processing Pipeline 703, and the like. In those embodiments using trilinear optimization to reduce the number of texture samples read from Local Memory 740 or Host Memory 712 may improve graphics processing performance. In another embodiment of Computing System 700 graphics processing performance is limited by computational resources, e.g., multipliers, adders, and the like, within Fragment Processing Pipeline 760. In that embodiment using anisotropic optimization to speed up texture filtering by reducing the number of texture samples filtered using anisotropic filtering may improve graphics processing performance. In various embodiments a programmed bias may be used to control reduction of the number of texture samples used during anisotropic filtering, permitting a user to determine a balance between improved graphics processing performance and image quality.

Fragment Shader 755 outputs processed fragment data, e.g., color and depth, and codewords generated from shader program instructions to Raster Operations Unit 765. Raster Operations Unit 765 includes a read interface and a write interface to Memory Controller 720 through which Raster Operations Unit 765 accesses data stored in Local Memory 740 or Host Memory 712. Raster Operations Unit 765 optionally performs near and far plane clipping and raster operations, such as stencil, z test, blending, and the like, using the fragment data and pixel data stored in Local Memory 740 or Host Memory 712 at a pixel position (image location specified by x,y coordinates) associated with the processed fragment data. The output data from Raster Operations Unit 765 is written back to Local Memory 740 or Host Memory 712 at the pixel position associated with the output data and the results, e.g., image data are saved in graphics memory.

When processing is completed, an Output 785 of Graphics Subsystem 707 is provided using Output Controller 780. Alternatively, Host Processor 714 reads the image stored in Local Memory 740 through Memory Controller 720, Interface 717 and System Interface 715. Output Controller 780 is optionally configured by opcodes to deliver data to a display device, network, electronic control system, other Computing System 700, other Graphics Subsystem 707, or the like.

The invention has been described above with reference to specific embodiments. Persons skilled in the art will recognize, however, that various modifications and changes may be made thereto without departing from the broader spirit and scope of the invention as set forth in the appended claims. For example, in alternative embodiments, the anisotropic optimization technique set forth herein may be implemented either partially or entirely in a software program, or a fragment program executed by Fragment Shader 755. The foregoing description and drawings are, accordingly, to be regarded in an illustrative rather than a restrictive sense. The listing of steps in method claims do not imply performing the steps in any particular order, unless explicitly stated in the claim.

The invention claimed is:

1. A computer-implemented method of computing a biased anisotropic ratio value for anisotropic texture map filtering, comprising:

receiving an anisotropic ratio value for a texture map that represents the ratio of a minor axis of a pixel footprint in texture map space to the major axis of the pixel footprint in the texture map space;

multiplying the anisotropic ratio value by a bias to produce the biased anisotropic ratio value;

determining a number of texture samples to filter based on the biased anisotropic ratio value;

reading the number of texture samples from a memory; and filtering the number of texture samples in a texture unit to produce a filtered texture sample for the pixel footprint; and storing the filtered texture sample in the memory at a position of the pixel footprint within an image.

2. The method of claim 1, further comprising the step of summing the bias with one prior to the step of multiplying.

3. The method of claim 2, further comprising the step of clamping the biased anisotropic ratio value to a number less than or equal to one.

4. The method of claim 2, wherein the bias is programmed.

5. The method of claim 2, wherein the number of texture samples are all read from a single mip map of the texture map.

6. The method of claim 2, wherein the bias ranges from 0 to 15/16.

7. The method of claim 1, further comprising determining the bias based on a performance mode selected by a user.

8. The method of claim 1, further comprising performing trilinear filtering when the biased anisotropic ratio value is greater than or equal to one.

9. The method of claim 1, further comprising performing anisotropic filtering when the biased anisotropic ratio value is less than one.

10. The method of claim 1, wherein the bias corresponds to a texture identifier that is associated with a fragment of a primitive.

11. The method of claim 1, further comprising the step of adding a level of detail bias to a level of detail value that specifies a mip map from which the number of texture samples are obtained.

12. A programmable graphics processor for generating images using anisotropically filtered texture samples, comprising:

a texture unit configured to receive texture parameters and compute a filtered texture sample, the texture unit including an anisotropic optimization unit configured to compute a biased anisotropic ratio value indicating a number of texture samples to anisotropically filter by scaling an anisotropic ratio value that represents the ratio of a minor axis of a pixel footprint in texture map space to the major axis of the pixel footprint in the texture map space by a bias to produce the biased anisotropic ratio value and clamping the biased anisotropic ratio value to a number less than or equal to one.

13. The programmable graphics processor of claim 12, further comprising an address computation unit configured to determine one or more read addresses using at least a portion of the texture parameters and the biased anisotropic ratio value.

14. The programmable graphics processor of claim 12, further comprising a texture filter unit configured to receive one or more texture samples from memory and a portion of the texture parameters and produce an anisotropically filtered texture sample.

15. The programmable graphics processor of claim 12, wherein the anisotropic optimization unit includes a storage element configured to store the bias.

16. The programmable graphics processor of claim 12, wherein the anisotropic optimization unit includes a storage element configured as a lookup table that stores the bias.

17. The programmable graphics processor of claim 12, wherein the anisotropic optimization unit is further configured to scale the anisotropic ratio value by the bias summed with one to produce the biased anisotropic ratio value.

18. The programmable graphics processor of claim 12, wherein the anisotropic optimization unit is further configured to determine the bias based on a performance mode selected by a user.

19. The programmable graphics processor of claim 12, further comprising a texture filter unit that is configured to perform anisotropic filtering when the biased anisotropic ratio value is less than one.

* * * * *